Feb. 9, 1932.  E. J. BRYANT  1,844,241
SCREW EXTRACTOR
Filed Dec. 19, 1930
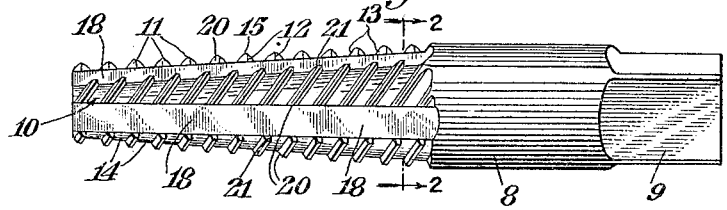
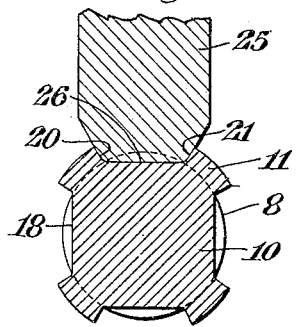 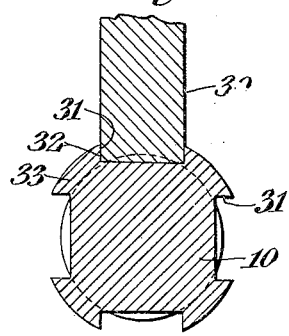 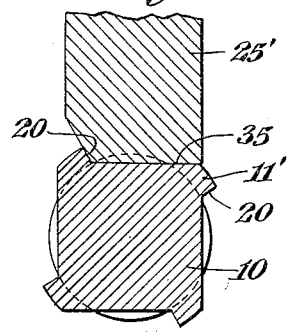
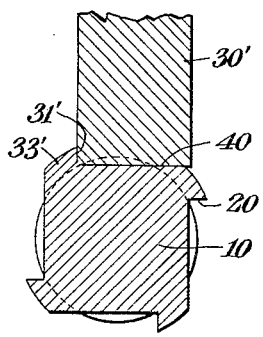 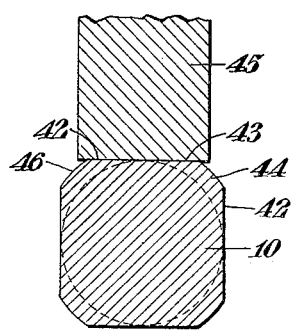 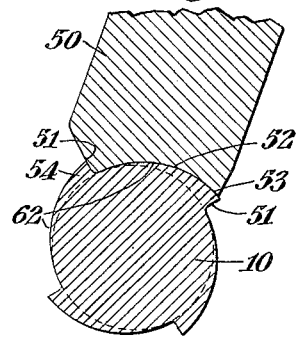
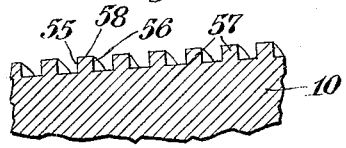
INVENTOR
Elmer J. Bryant
BY his ATTORNEYS
Edwards, Bower & Pool Patented Feb. 9, 1932

1,844,241

UNITED STATES PATENT OFFICE

ELMER J. BRYANT, OF GREENFIELD, MASSACHUSETTS, ASSIGNOR TO GREENFIELD TAP AND DIE CORPORATION, OF GREENFIELD, MASSACHUSETTS, A CORPORATION OF MASSACHUSETTS

SCREW EXTRACTOR

Application filed December 19, 1930. Serial No. 503,385.

This invention relates to screw extractors for removing broken screws and the like, and particularly to extractors adapted to engage in a recess formed in the screw to receive the extractor.

The object of the invention is to provide a screw extractor that will be simple and rugged in structure and effective to grip and turn the screw to be removed.

Further objects of the invention, particularly in connection with the form of the threading of the extractor, will appear from the following description taken in connection with the accompanying drawings in which Fig. 1 is a side view of an extractor illustrating one embodiment of the invention, Fig 2 is a sectional view on line 2—2 of Fig. 1 and indicating the cutter forming the longitudinal fluting, Figs. 3, 4, 5, 6 and 7 are sectional views similar to Fig. 2 but illustrating modifications, and Fig. 8 is a partial sectional view illustrating a modified form of thread.

In the specific embodiment of the invention shown in the drawings, the extractor has the shank 8 and head 9 and body 10 tapered about one and one half inches to the foot. Threads 11 are formed on the body 10 and are left-handed for extraction of right-hand threaded screws or right-handed for the extraction of left-hand threaded screws.

The threads 11 preferably have their sides 12 toward the shank at substantially right angles to the body while their opposite sides 13 toward the tip are inclined at about 45°. This form of the thread section aids in reducing expanding action on the broken screw since the faces 12 of the threads, being normal to the taper, transmit their pressures substantially along the axis of the screw and with practically no outward thrust. Consequently, there is lessened tendency to tighten and bind the broken screw in its threaded recess and it is correspondingly easier to remove. These threads may be spaced apart as shown to leave the surface 14 between them, the lead being such as to provide a plurality of parallel helical threads on the tapered body. The crest 15 of the threads are made blunt or flat as shown and the height of the threads from base to crest is less than the width of the base between sides 12 and 13.

Longitudinal flutes 18 are cut through the threads and divide the threads into parallel longitudinal rows of thread sections, each thread section having a cutting face 20 and a trailing or heel portion 21 at the ends of each thread section. This may be accomplished by a rotary cutter 25 (Fig. 2) shaped and set to follow down along the taper and remove the metal above the contour line 26 of the flute.

I have found it advantageous to thus specially form the threads to develop an effective rotary moment on the part to be extracted while the outward thrust component of the extractor is minimized to reduce the tendency to expand said part and bind it against removal.

To give the extractor a strong grip on the screw without excessive expansion, the parallel threads will preferably have a mean helix angle of about 25°, varying from about 20° for the larger sizes (over two inch shank diameter) to about 30° for the smallest sizes, and large portions of these threads are removed by the fluting, and the cutting faces 20 are sharply angled to be approximately normal to the cutting force to make a good gouging chip as the thread form proceeds in its helical path into the hole drilled in the broken screw. The lines of pressure tend to compose themselves normal to the cutting faces 20 which will be tangential with relation to the wall of the screw recess and with very little effort in an outward or expanding direction. This retards the forward or inward travel of the extractor and translates the composition of forces into a rotary moment to remove the broken screw. Following each cutting face 20 is a relatively short thread section.

For instance, as shown in Fig. 2 over 50% of the thread crest at the middle of the taper has been removed by the fluting, the relative removal increasing toward the smaller end and decreasing toward the shank 8. The diameter of the thread tends to expand in the direction of the shank and with this expanding crest continued for any substantial distance expansive forces tend to be developed in the part to be removed as the thread cuts its way into the wall of the drilled recess. By reducing each thread following each cutting face 20, the expanding action is correspondingly decreased.

In the modification illustrated in Fig. 3 the cutter 30 is formed with substantially vertical cutting edges at 31 so that the resulting cutting face 32 of the threads 33 are tipped relatively forward or in effect are undercut with relation to the surface of the drilled recess in the broken screw.

The extractors of Figs. 4 and 5 are similar to those of Figs. 2 and 3 respectively, but with the trailing or heel portion of the threads 11′ and 33′ removed or cut off by continuation of the horizontal cutting edge of the cutters 25′ and 30′ as indicated at 35 and 40. Such a formation of the cutter contour forming the fluting will still further decrease the lengths of the threads, particularly at the crest. In Fig. 6 the fluting is formed by a straight edge cutter 45 so that the cutting faces 42 following the heel faces 43 of the threads 44 are in substantially the same plane, the crests 46 being reduced to the apex portions shown.

In Fig. 7 the contour of the fluting cutter 50 is such as to provide a sharp cutting face 51 on the threads in front of which is an arcuate surface 52 gradually approaching the apex 53 of the preceding threads 54 and cutting across this apex at a very slight angle. The height of the threads thus diminishes behind each cutting face 51 and the rate of diminution is such as to cause the surface 62 formed by the cutter edge 52 to gradually recede from the surface cut by the apex of the cutting edge 51.

In Fig. 8 the modified form of thread section positions both side faces 55, 56 of the threads 57 normal to the surface of the tapered body portion 10 so that there is practically no outward thrust exerted by these faces. The broad apexes or top portions 58 of the threads extend from side walls 55 to the side walls 56 on arcs concentric around the axis of the extractor. The cutting faces and heel faces of the threads shown in Fig. 8 may be formed in any desired manner, as shown for instance in Figs. 2 to 7 inclusive, but with this square form of thread section shown in Fig. 8 the fluting contours of Figs. 5, 6 and 7 are probably preferable as having the shorter thread crests, and, therefore, avoiding any tendency of the following crest 58 to wedge outward with an undesirable expanding action on the part being extracted.

I claim:

1. In a screw extractor the combination with a tapered body portion, of helical threading thereon, longitudinal fluting separating said threading into a plurality of rows of thread lengths, said thread lengths having leading cutting faces extending substantially normal to said tapered body portion.

2. In a screw extractor the combination with a tapered body portion, of a plurality of parallel helical threads winding around said body portion and interrupted to form longitudinal rows of thread sections thereon, said threads being spaced apart to leave helical surfaces between the threads, and grooves or flutes separating said rows, cutting faces at the ends of said threads of each row with the threads following said edges extending helically toward the larger portion of said tapered body and being of a mean length less than the distance between said rows.

3. In a screw extractor the combination with a tapered body portion, of a plurality of parallel helical threads thereon, said threads being spaced apart to leave helical surfaces between the threads, each thread being separated into a plurality of successive lengths with intervening flutes of substantially constant width, each thread length having a leading cutting edge and a following portion of mean length less than the width of said flute.

4. In a screw extractor the combination with a tapered body portion, of helical threading thereon at a lead angle of less than 45°, longitudinal fluting interrupting said threading and providing lands of interrupted threads having cutting faces on their ends toward the small end of said body and extending approximately in the direction of planes containing the axis of the extractor.

5. In a screw extractor the combination with a tapered body portion, of helical threading thereon at a lead angle of less than 45°, longitudinal fluting interrupting said threading and providing lands of interrupted threads having cutting faces on their ends toward the small end of said body and extending approximately in the direction of planes containing the axis of the extractor and heel surfaces at substantial angles to such planes.

6. In a screw extractor the combination with a tapered body portion, of helical threading thereon, each of said threads having at least one side surface substantially perpendicular to the surface of said body portion, and a flattened crest surface, and longitudinal fluting cutting said threading into rows or lands of interrupted threads.

ELMER J. BRYANT.